United States Patent [19]

Haas

[11] Patent Number: 4,624,991

[45] Date of Patent: Nov. 25, 1986

[54] COLD-STRETCHABLE, SELF-ADHESIVE FILM COMPOSITION

[75] Inventor: Armand Haas, Mazingarbe, France

[73] Assignee: Societe Chimique des Charbonnages-CdF Chimie, France

[21] Appl. No.: 747,391

[22] Filed: Jun. 21, 1985

Related U.S. Application Data

[63] Continuation of Ser. No. 396,659, Jul. 9, 1982, abandoned.

[30] Foreign Application Priority Data

Jul. 15, 1981 [FR] France .................................. 81 13758

[51] Int. Cl.$^4$ ...................... C08L 23/18; C08L 23/22; C08L 23/28; C08L 23/12
[52] U.S. Cl. ..................................... 525/209; 525/232; 525/240
[58] Field of Search ....................... 525/240, 209, 232

[56] References Cited

U.S. PATENT DOCUMENTS

| | | | |
|---|---|---|---|
| 3,645,992 | 2/1972 | Elston | 260/80.78 |
| 4,170,304 | 10/1979 | Huke | 206/597 |
| 4,205,021 | 5/1980 | Morita et al. | 525/240 |
| 4,243,619 | 1/1981 | Fraser et al. | 244/40.6 |
| 4,337,188 | 6/1982 | Climenhage | 525/240 |
| 4,363,904 | 12/1982 | Fraser et al. | 526/348.2 |
| 4,425,268 | 1/1984 | Cooper | 525/210 |
| 4,426,498 | 1/1984 | Inoue | 525/211 |
| 4,430,457 | 2/1984 | Dobreski | 525/240 |

FOREIGN PATENT DOCUMENTS

| | | |
|---|---|---|
| 0011930 | 6/1980 | European Pat. Off. . |
| 1277594 | 1/1961 | France . |
| 1342926 | 8/1962 | France . |
| 2041949 | 9/1980 | United Kingdom . |

*Primary Examiner*—Carman J. Seccuro
*Attorney, Agent, or Firm*—Finnegan, Henderson, Farabow, Garrett & Dunner

[57] ABSTRACT

A cold-stretchable, self-adhesive film composition comprising (a) from 88 to 97% by weight of an ethylene-α-olefin copolymer, the α-olefin having from 3 to 10 carbon atoms and the copolymer having a density of between 0.905 and 0.940 g/cm$^3$ and a melt index of between 0.1 and 2 dg/minutes and; (b) from 3 to 12% by weight of a polymer selected from among polyisobutylene, atactic polypropylene, cis-polybutadiene and bromobutyl rubber. The film compositions find particular use in the automation of the spiral wrap-round packaging technique.

12 Claims, No Drawings

COLD-STRETCHABLE, SELF-ADHESIVE FILM COMPOSITION

This application is a continuation of application Ser. No. 396,659 filed July 9, 1982, now abandoned.

BACKGROUND OF THE INVENTION

The present invention relates to a cold-stretchable, self-adhesive film composition.

The literature gives numerous examples of compositions, based on ethylene polymers, for the manufacture of self-adhesive plastic films. Typically, in a first stage, these compositions contain a low density polyethylene (obtained by a free radical polymerization process) and varying amounts of an ethylenepropylene copolymer of an elastomeric type, having a Mooney viscosity of between 15 and 80. Examples of such compositions are described in French Patent Nos. 2,368,416, 2,405,972, British Patent No. 2,038,845, and U.S. Pat. Nos. 4,110,414 and 4,123,417. Subsequently, other documents have described the need for a supplementary treatment by a corona discharge, as in French Patent No. 2,392,064, and the possibility of replacing the low density polyethylene by a linear ethylene-1-butene copolymer, as in European Patent No. 0,014,539. European Patent No. 0,011,930 has described the possibility of replacing the ethylene-propylene copolymer of an elastomeric type by a polyisobutylene and of combining this with a low density polyethylene or with an ethylenevinyl acetate copolymer.

Moreover, French Patent No. 2,277,852 (EXXON) describes a composition for the manufacture of a self-adhesive film, wherein the film is comprised of:
(a) from 85 to 99.8% by weight of a thermoplastic polyolefin,
(b) from 0.1 to 10.00% by weight of a partial ester of a carboxylic acid and a polyol, and
(c) either from 0.1 to 10% by weight of a hydrogenated hydrocarbon resin, or from 0.1 to 10% by weight of polybutene or of polyisobutene, with the proviso that the combined weights of (b) and (c) do not exceed 15% by weight. The patent states, on page 5, lines 32-34, that the preferred amount of constituent (c) is less than or equal to 3% by weight.

Moreover, it is known that the films manufactured from low density polyethylene (obtained by a free radical polymerization process) exhibit properties, such as ease of stretching, cohesive force and mechanical properties, that have been inadequate and thus such films have not enjoyed major development in the cold-stretchable film technique. Cold-stretching is a packaging technique which consists of keeping several bundles of identical or different nature, but of relatively regular geometrical shape, grouped together by stretching a film, at ambient temperature, around these bundles. The film can be stretched either by the curtain machine technique or by the wrap-round technique.

In the curtain machine technique, the width of the film arranged vertically corresponds to the height of the contents. The ends of the film, stretched either directly or indirectly, are welded over the whole of this width. The welding is effected under tension so as to maintain the stretching.

The wrap-round technique can be sub-divided into two embodiments: the straight wrap-round technique and the spiral wrap-round technique. In the straight wrap-round technique, the width of the film in general corresponds to the height of the contents, and the unwound film is stretched between a braking cylinder and the contents themselves. In the spiral wrap-round technique, the width of the film is less than the height of the contents, and the contents rotate and stretch the film as in the preceding case. To cover the entire height of the contents, the film is subjected to an upward movement and hence describes a spiral. The stretching that takes place between the braking cylinder and the contents, or between the reel of film, which is itself braked, and the contents, depends on the speed of rotation of the contents and/or the degree of freedom imposed on the braking cylinder or on the reel. In the spiral wrap-round technique, currently the most widely used, complete automation requires that positioning of the ends of the film should be achieved. This problem is one of those to which the present invention provides a solution.

As has been seen from the various patents cited above, the plastics most commonly used in the cold-stretchable film technique have been low density polyethylene (obtained by a free radical polymerization process) and ethylene-vinyl acetate copolymers. These polymers, to which the addition of an ethylenepropylene copolymer of an elastomeric type imparts self-adhesive properties, exhibit characteristics which restrict the scope for development of the cold-stretchable film technique. Thus, in view of the speeds of stretching (of the order of 40 m/minute between the reel and the contents) usually employed in this technique, it is essential to restrict the degree of stretch of these polymers to about 30% in order not to run the risk of generating a stretching force close to the breaking strength of the polymer and hence so as not to cause continual breaks during production. The mechanical properties of the cold-stretched films of the prior art, however, were mediocre: an elongation at break of the order of 500%, a breaking strength of the order of 200 kg/cm$^2$, and a tear strength of the order of 250 g, for a 50 μm thick film.

SUMMARY OF THE INVENTION

The object of the present invention thus consists in proposing a polymer film which exhibits both the characteristics required in the cold-stretching technique, i.e. the best possible mechanical properties and the best capability for maximum stretching under the action of the lowest possible force at speeds which can be as high as 40 m/minute, and further the characteristic of ease of positioning of the ends of film in the spiral wrap-round technique, so as to allow complete automation of the technique. This last condition is achieved, according to the invention, by the use of a self-adhesive film.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the invention provides a cold-stretchable and self-adhesive film comprising an ethylene-α-olefin copolymer and a polymer selected from polyisobutylene, atactic polypropylene, cis-polybutadiene, and bromobutyl rubber. More particularly, the film compositions according to the invention comprise:

(a) from 88 to 97% by weight of an ethylene-α-olefin copolymer, the α-olefin having from 3 to 10 carbon atoms and the copolymer having a density of between 0.905 and 0.940 g/cm³ and a melt index of between 0.1 and 2 dg/minute; and (b) from 3 to 12% by weight of a polymer selected from among polyisobutylene, atactic polypropylene, cis-polybutadiene and bromobutyl rubber.

DESCRIPTION OF THE PREFERRED EMBODIMENT

Reference will now be made in detail to the presently preferred embodiments of the invention.

The ethylene-α-olefin copolymers which can be used within the scope of the present invention are manufactured by Ziegler-type polymerization processes, either at low pressure in solution in an inert hydrocarbon or at high pressure and high temperature in a homogeneous reactor. Such polymers have already been described, especially in French Patent No. 1,172,726, No. 1,604,980, and No. 2,451,924. However, preferred copolymers or carrying out the present invention are copolymers of ethylene and of α-olefins that contain at least 4 carbon atoms, wherein the copolymers have a density of between 0.905 and 0.940 g/cm³, and have a melt index of between 0.2 and 2 dg/minute. The copolymers have an average content of α-olefin units of between 1 and 8 mol % and the distribution of the α-olefin units in the copolymer is heterogeneous, the copolymer containing crystalline fractions and amorphous fractions, and the content of α-olefin units in the copolymer varying between at least 0.2 and at most 5 times the average content of α-olefin depending on the fractions considered. Such copolymers are described in French Patent Application No. 81/13,598. The process for manufacturing such copolymers consists of copolymerizing ethylene and an α-olefin having at least 4 carbon atoms in at least one reactor comprising at least one zone at a temperature of between 180° and 320° C. and under a pressure between 300 and 2500 bars, by means of a Ziegler-type catalyst system comprising an activator chosen from the group consisting of the hydrides and the organometallic compounds of the metals of groups I to III of the Periodic Table, and at least one halogen compound of a transition metal. The process comprises gas flow feeding the reactor, consisting of 10 to 80% by weight of ethylene and 20 to 90% by weight of α-olefins, when in steady-state operation, and a catalyst system that has a reactivity towards ethylene which is very much greater, preferably from 5 to 15 times greater, than its reacivity towards α-olefins.

An example of such a catalyst system has the formula:

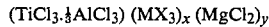

$(TiCl_3.\frac{1}{3}AlCl_3)(MX_3)_x(MgCl_2)_y$ in which $0.3 \leq x \leq 3$, $0 \leq y \leq 20$, M is a transition metal chosen from groups VB, VIB and VIII of the Periodic Table, and X is a halogen.

The nature of constituent (b) of the present invention is very important and has been chosen, in accordance with the nature of constituent (a), so as to provide maximum efficiency in solving the problems referred to above. Thus, the constitutents (b) proposed within the scope of the present invention are preferred to both the ethylene-propylene copolymers of an elastomeric type used in the prior art and aromatic petroleum resins.

The proportion of constituent (b) in the compositions according to the invention is also chosen, in accordance with the nature of constituent (a), so as to achieve optimum efficiency. This proportion by weight is preferably between 3 and 10% if constituent (b) is polyisobutylene, and between 5 and 12% if constituent (b) is atactic polypropylene.

Cold-stretchable and self-adhesive films can be obtained from compositions according to the invention by extrusion-blowing through a cylindrical die at a temperature which is generally between 200° C. and 280° C., with a blow-up ratio of between 1.5 and 4. They can also be obtained by extrusion through a flat die, the more adhesive face of the film being that which is in contact with the cooling roller. These films have a thickness of approximately between 10 and 150 μm and exhibit remarkable properties in respect of being cold-stretchable at a speed of the order of 40 m/minute and with a degree of stretch of the order of 100%, which is more than 3 times greater than the degree of stretch usually possible for the self-adhesive compositions based on low density polyethylene.

This remarkable feature of the films of the present invention is maintained even if up to 15% by weight of low density polyethylene (obtained by a free radical process) is substituted for the ethylene-α-olefin copolymer which forms constituent (a) of the compositions previously described. The ternary compositions thus obtained also form part of the present invention.

The compositions according to the invention can be obtained according to the conventional methods such as the use of a mixer of the Banbury type, a continuous high-intensity mixer, or a mixing extruder. The compositions can also be obtained by incorporating constituent (b) directly into the reactor in which constituent (a) is manufactured, either during the copolymerization reaction or at the outlet of the reactor.

The films according to the invention exhibit the advantageous peculiarity of having a transverse tear strength of the order of 700 to 800 g for a film 50 μm thick, which is both very much greater than that of the self-adhesive films of the prior art and also greater than that of a film of the same thickness manufactured from constituent (a) alone.

The purpose of the following examples is to illustrate several embodiments of the present invention without implying a limitation.

EXAMPLE 1

Manufacture of a heterogeneous ethylene-1-butene copolymer

Ethylene and 1-butene are copolymerized in an autoclave reactor of cylindrical shape, operating under a pressure of 900 bars and fitted internally with a stirrer and with metal screens which delimit three zones. Zone 1, kept at a temperature of 210° C., has a volume twice that of each of the two subsequent zones, and is fed with a stream of 200 kg/h of a mixture comprising 36% by weight of 1-butene and 64% by weight of ethylene. It also receives a catalyst system comprising dimethylethyldiethyl-siloxalane and a compound of the formula $TiCl_3.\frac{1}{3}AlCl_3.VCl_3$. Zone 2, kept at a temperature of 240° C., is fed with a stream of 55 kg/h of the same mixture as above, and receives the same catalyst system. Finally, Zone 3, at the outlet of which the reaction mixture containing the copolymer is discharged to a separating and recycling device, is kept at a temperature of 280° C. and receives neither monomer nor catalyst.

The mean residence time of the catalyst system in the reactor is 43 seconds.

A copolymer having a melt index (measured according to Standard Specification ASTM D 1238-73) of 0.8 dg/minute, a density (measured according to Standard Specification NF T 51-063) of 0.919 g/cm³, a number-average molecular weight (measured by gel permeation chromatography) of 43,000, a polydispersity index $M_w/M_n$ of 3.6, a mean molar content of 1-butene units of 3.2% and a melting point of the crystalline fraction (determined by differential enthalpy analysis) of 122° C. is thus obtained, with a catalytic yield of 6.2 kilograms of copolymer per milli-atom of transition metal (titanium and vanadium). The heterogeneity of the distribution of 1-butene in the copolymer (determined by a copolymer fractionation test) is expressed in terms of the multiple (2.2 times) and the sub-multiple (0.5 times), of the mean content, between which the content of 1-butene units varies, depending on the fractions considered.

EXAMPLES 2 to 7

A mixture of the copolymer described in Example 1 and of a constituent (b), of which the nature and amount (expressed in percent by weight relative to the mixture) are shown in Table 1, is extruded through an annular die at a temperature of 240° C. and converted to a tubular film having a thickness of 30 μm. The following properties are measured on this film: adhesive force, F, determined according to Standard Specification ASTM D 3354-74 and expressed in grams. This force is measured according to the following method: samples in the form of strips 7.5 cm wide and 10.5 cm long are taken. The samples, arranged two by two and face to face, are subjected to a pressure of 80 g/cm² for 3 hours. The force F which has to be applied to separate the two samples is then measured by means of a parallel plate apparatus of the Davenport type. The tear strength in the transverse direction, TST, is determined according to Standard Specification ASTM D 1922-67 and is expressed in grams. The results of these measurements are shown in the table below.

In Example, 2 (comparative example), no constituent (b) is mixed with the base copolymer. In Examples 3 to 5, the constituent (b) is a polyisobutylene, referred to as PIB. In Examples 6 and 7, the constituent (b) is an atactic polypropylene, referred to as APP, having a density of 0.900 g/cm³, a number-average molecular weight of 2,000 and a melt index greater than 200 dg/minute, and exhibiting a complete absence of crystallinity according to differential enthalpy analysis. Moreover, in Examples 5 to 7, 10% by weight of the ethylene-1-butene copolymer was replaced by polyethylene of density 0.922 g/cm³ (obtained by a free radical process), so as to give ternary compositions. The results of these examples are summarized in Table 1.

The films obtained can be cold-stretched with a degree of stretch of 100% and exhibit very good mechanical properties, namely an elongation at break of between 600 and 900%, and a breaking strength of between 200 and 300 kg/cm².

TABLE 1

| | | Examples | | | | |
|---|---|---|---|---|---|---|
| | | 2 | 3 | 4 | 5 | 6 | 7 |
| (b) | constituent | — | PIB | PIB | PIB | APP | APP |
| | quantity (%) | 0 | 5 | 7.5 | 10 | 5 | 10 |
| | F | 5 | 67 | 83 | 100 | 65 | 97 |
| | TST | 410 | 440 | 450 | 470 | 440 | 465 |

It will be apparent to those skilled in the art that various modifications and variations can be made in the composition of the invention without departing from the scope of or spirit of the invention.

What is claimed is:

1. A cold-stretchable, self-adhesive film composition consisting essentially of:
    (a) from 88 to 97% by weight of an ethylene-α-olefin copolymer, the distribution of said α-oleofin units in the copolymer being heterogeneous, said α-olefin having from 3 to 10 carbon atoms and said copolymer having a density of between 0.905 and 0.940 g/cm³ and a melt index of between 0.1 and 2 dg/min and;
    (b) from 3 to 12% by weight of a polymer selected from the group consisting of polyisobutylene, atactic polypropylene, cis-polybutadiene and bromobutyl rubber;
    wherein film produced from said composition exhibits an adhesive force of at least about 65 grams as determined by standard specification ASTM 3354-74.

2. The composition of claim 1, wherein said copolymer is a copolymer of ethylene and one or more α-olefins having at least 4 carbon atoms and wherein said copolymer has a melt index of between 0.2 and 2 dg/minute, the copolymer having an average content of α-olefin units of between 1 and 8 mol % and the distribution of α-olefin units in the copolymer being heterogeneous, the said copolymer containing crystalline fractions and amorphous fractions, and wherein the content of α-olefin units in the copolymer varies between at least 0.2 and at most 5 times the average content of α-olefin units, depending on the fractions considered.

3. The composition of claim 1, wherein the composition contains from 3 to 10% by weight of polyisobutylene as constituent (b).

4. The composition of claim 1 wherein the composition contains from 5 to 12% of atactic polypropylene as constituent (b).

5. The composition of claim 1, wherein up to 15% by weight of constituent (a) of the composition is replaced by low density polyethylene obtained by a free radical process.

6. The cold-stretchable self-adhesive film of claim 1 wherein said film is obtained by extrusion-blowing or by extrusion through a flat die.

7. The film of claim 6, wherein said film is obtained by extrusion-blowing at a temperature between 200 and 280° C.

8. A film according to claim 6 wherein said film is obtained by extrusion-blowing with a blow-up ratio of between 1.5 and 4.

9. A film according to claim 6 wherein the thickness of said film is between 10 and 150 μm.

10. The composition of claim 1, wherein the composition contains cis-polybutadiene as constituent (b).

11. The composition of claim 1, wherein the composition contains bromobutyl rubber as constituent (b).

12. The composition of claim 1, wherein said ethylene olefin copolymer is an ethylene-1-butene copolymer.

* * * * *